United States Patent
Graham, Sr.

(10) Patent No.: US 8,215,364 B2
(45) Date of Patent: Jul. 10, 2012

(54) ERGONOMIC SQUEEGEE WITH BLADE FOR ADHESIONS AND DETACHMENT

(75) Inventor: Jeremy Lee Graham, Sr., Hardeeville, SC (US)

(73) Assignee: Jeremy L Graham, Sr., Hardeeville, SC (US)

( * ) Notice: Subject to any disclaimer, the term of this patent is extended or adjusted under 35 U.S.C. 154(b) by 248 days.

(21) Appl. No.: 12/315,253

(22) Filed: Feb. 9, 2009

(65) Prior Publication Data

US 2009/0145557 A1    Jun. 11, 2009

(51) Int. Cl.
*B32B 38/00* (2006.01)
*B32B 38/04* (2006.01)

(52) U.S. Cl. ......... 156/526; 156/510; 156/523; 156/527

(58) Field of Classification Search .................. 156/510, 156/516, 517, 523, 526, 527; 15/117, 118, 15/121, 245, 245.1

See application file for complete search history.

(56) References Cited

U.S. PATENT DOCUMENTS

| | | | | | |
|---|---|---|---|---|---|
| 2,277,528 | A | * | 3/1942 | Osborn | 15/236.02 |
| 5,251,351 | A | * | 10/1993 | Klotz | 7/100 |
| 6,092,255 | A | * | 7/2000 | Kim | 15/121 |
| 6,453,970 | B1 | * | 9/2002 | Stone et al. | 156/579 |
| 7,604,033 | B2 | * | 10/2009 | Gray | 156/510 |

* cited by examiner

*Primary Examiner* — Mark A Osele
*Assistant Examiner* — Christopher C Caillouet

(57) ABSTRACT

An improved squeegee and method of modifying a conventional squeegee. A novel hand tool for adherence assistance and cutting of tapes with threads incorporated into it. The squeegee is approximately 4 inches by 3 inches and held in one hand. While rubbing over the surface of the tape being adhered with the 4 inch elongated side causing friction heat for the glue of the tape to adhere. Turning the squeegee around to the other elongated 4 inch side where there is a cutting blade to separate the tape from the roll. The squeegee will provide a simplified and more commercially feasible method for a hand held tool for adherence and separation of tapes.

1 Claim, 1 Drawing Sheet

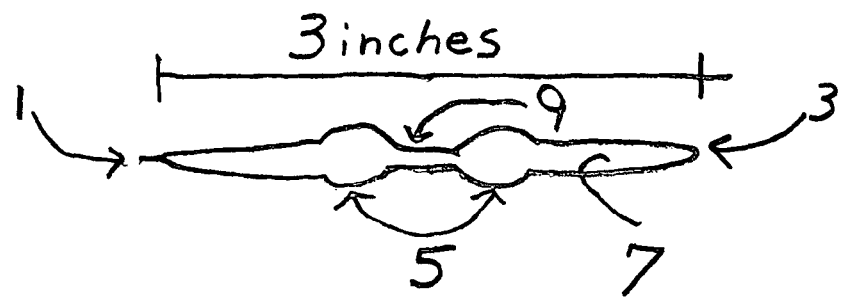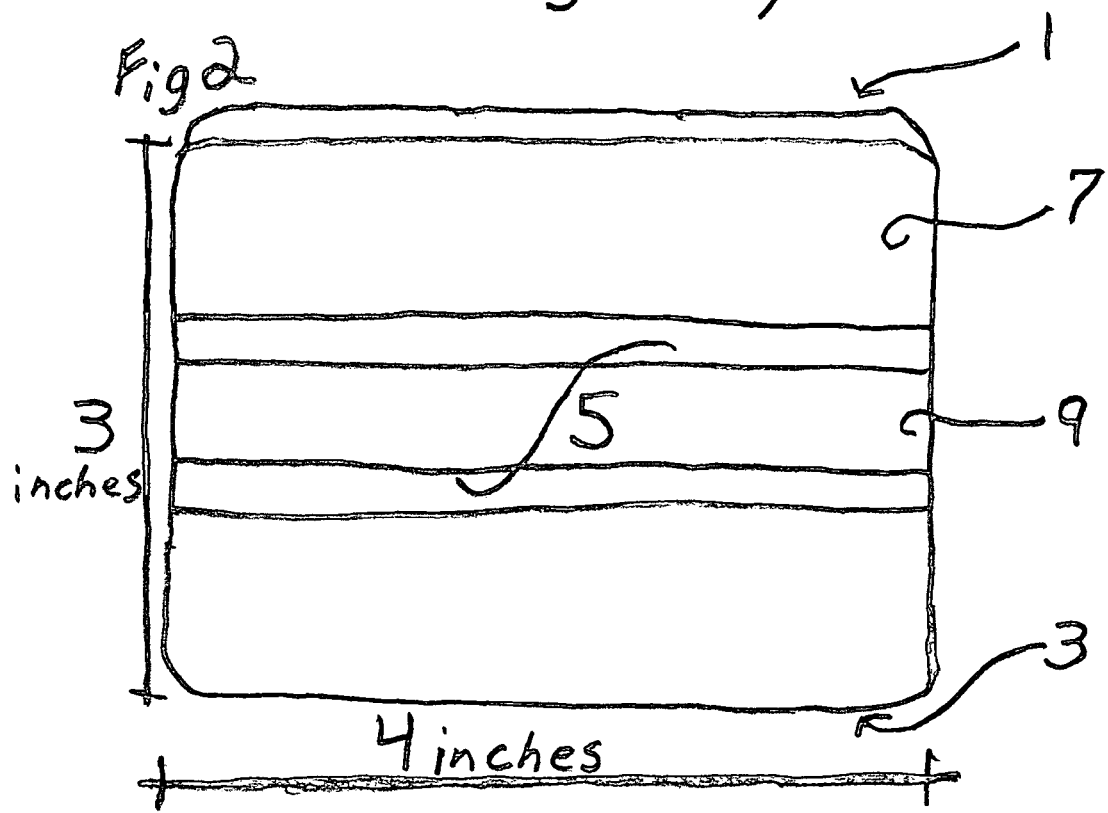

ERGONOMIC SQUEEGEE WITH BLADE FOR ADHESIONS AND DETACHMENT

FIELD OF INVENTION

The invention relates to squeegees, which are used for tape adhesion. In particular the invention involves a flexible plastic squeegee. On one side of the squeegee is used for creating friction for more desirable tape adhesion. On the other side of the squeegee a blade used for cutting the tape used by HVAC for ductwork, the special tape in question has threads incorporated inside of it; therefore the bladed side of the squeegee is needed because the tape in unable to be torn.

BACKGROUND OF THE INVENTION

The art of HVAC duct installation requires the use of many types of tapes for many purposes. The type of tape in question has threads incorporated into it for strength. Until now the installers of ductwork have used a squeegee with two sides edged used for creating friction which causes heat that makes the glue of the tape more adhesive. After applying the tape to the length required the tape must then be cut with a knife. Therefore the invention in question minimizes the number or tools used and handled for faster and more productive installation. The new tool is not restricted to HVAC it has many other user in many other fields.

BRIEF DESCRIPTION OF THE DRAWINGS

A more complete understanding of the invention can be understood by referring to the following detailed description and with the accompanying drawings wherein:

FIG. 1 is an end on view of a squeegee embodiment of the present invention and FIG. 2 is a broad or top view of the squeegee embodiment showing over all view of the hand tool.

DETAILED DESCRIPTION OF THE DRAWINGS

Referring now to the drawings. Illustrations are indicated by like reference numerals.

FIG. 1 illustrates a side view or an end on view of the hand tool. 1 of the invention consists of a metal cutting blade protruding from the thinner edge of the squeegee, this edge is for cutting the surface being applied. The surface applied is a tape with threads incorporated. This blade 1 is used for easy removal of the tape in various lengths. 3 is the equal and opposite side of the squeegee used for smoothing the tape to the surface being applied. The gripping ridges 5 assists in comfort and no slip grip when pressure is being applied to 1 blade. 9 the central section where the fingers and thumb will be placed for use of the squeegee.

FIG. 2. illustrates a broad or top view of the invention. 7 where the squeegee starts out thicker and thins down to an edge 3. A further important detail of the cutting edge 1 is the part of the tool that makes this squeegee valuable to the user.

I claim:
1. A combination handheld tape application and cutting tool, wherein the tool comprises:
   a squeegee having two blade edge portions formed on opposite longitudinal edges of said squeegee;
   said squeegee including a central portion between two blade edge portions of the squeegee;
   said central portion including a pair of spaced parallel apart protrusions which extend along a longitudinal length of said central portion of said squeegee, substantially parallel to said longitudinal blade edges of said squeegee;
   said squeegee central portion having a valley between said spaced apart protrusions, said protrusions being on both sides of said squeegee and said valley having a generally flat portion with a first thickness;
   wherein the squeegee blade comprises of a plastic material;
   wherein a metal cutting blade with a length equal to the opposite longitudinal blade edges of the squeegee is integrated into one of the said longitudinal blade edges so that said blade protrudes from said longitudinal blade edge.

* * * * *